US009202173B1

(12) United States Patent
Dotan et al.

(10) Patent No.: US 9,202,173 B1
(45) Date of Patent: Dec. 1, 2015

(54) USING LINK ANALYSIS IN ADVERSARIAL KNOWLEDGE-BASED AUTHENTICATION MODEL

(71) Applicant: EMC Corporation, Hopkinton, MA (US)

(72) Inventors: Yedidya Dotan, Newton, MA (US); Ayelet Eliezer, Givatyim (IL); Lawrence N. Friedman, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 423 days.

(21) Appl. No.: 13/628,642

(22) Filed: Sep. 27, 2012

(51) Int. Cl.
*G06F 17/00* (2006.01)
*G06N 5/02* (2006.01)
*G06N 5/04* (2006.01)
*G06N 99/00* (2010.01)

(52) U.S. Cl.
CPC .. *G06N 5/04* (2013.01); *G06N 5/02* (2013.01); *G06N 99/005* (2013.01)

(58) Field of Classification Search
None
See application file for complete search history.

(56) References Cited

U.S. PATENT DOCUMENTS

| 7,260,724 | B1 | 8/2007 | Dickinson et al. | |
|---|---|---|---|---|
| 8,412,938 | B2 | 4/2013 | Farrugia et al. | |
| 2008/0177841 | A1* | 7/2008 | Sinn et al. | 706/16 |
| 2009/0305670 | A1 | 12/2009 | DeBoer et al. | |
| 2010/0293600 | A1* | 11/2010 | Schechter et al. | 726/4 |
| 2010/0293608 | A1* | 11/2010 | Schechter et al. | 726/8 |
| 2011/0320484 | A1* | 12/2011 | Smithies et al. | 707/769 |

OTHER PUBLICATIONS

"Bayesian Networks for Knowledge-Based Authentication" Ye Chen and Divakaran Liginlal IEEE Transactions on Knowledge and Data Engineering, vol. 19, No. 5, May 2007.*
"Comparative Study of Authentication Techniques" Hafiz Zahid Ullah Khan Institute of Information Technology University of Science & Technology, Bannu Khyber Pakhtoon Khwa, Pakistan Aug. 2010 IJENS.*
"Authentication for People" Copyright 2009. Fred B. Schneider. All Rights Reserved.*

* cited by examiner

*Primary Examiner* — Kakali Chaki
*Assistant Examiner* — Luis Sitiriche
(74) *Attorney, Agent, or Firm* — BainwoodHuang

(57) ABSTRACT

An improved technique involves adjusting the operation of a KBA system based on facts that may contain information known to an adversary. Along these lines, the KBA system may receive an alert concerning an adversary that may know the answers to some of the KBA questions used by the KBA system in authenticating users. In response to alert, the KBA system may alter operations in order to account for the adversary. Subsequently, when a user requests authentication, the KBA system selects KBA questions based on adjustments made to the KBA system in order to avoid presenting the adversary with KBA questions derived from facts (s)he knows.

16 Claims, 5 Drawing Sheets

48

72

|       | User A | User B | User C | User D | User E |
|-------|--------|--------|--------|--------|--------|
| Fact1 | Yes    | Yes    | Yes    | Yes    | Yes    |
| Fact2 | Yes    | No     | Yes    | No     | Yes    |
| Fact3 | No     | No     | No     | No     | Yes    |
| Fact4 | No     | No     | No     | Yes    | No     |
| Fact5 | Yes    | Yes    | Yes    | Yes    | No     |
| Fact6 | Yes    | No     | Yes    | Yes    | Yes    |
| Fact7 | No     | No     | No     | No     | No     |
| Fact8 | Yes    | Yes    | Yes    | No     | No     |

74

76

|       | Link Strength |
|-------|---------------|
| Fact1 | 5             |
| Fact2 | 3             |
| Fact3 | 1             |
| Fact4 | 1             |
| Fact5 | 4             |
| Fact6 | 4             |
| Fact7 | 0             |
| Fact8 | 3             |

Figure 3

USING LINK ANALYSIS IN ADVERSARIAL KNOWLEDGE-BASED AUTHENTICATION MODEL

BACKGROUND

Conventional knowledge-based authentication (KBA) involves deriving questions regarding a particular user from facts in a database, and asking that user one or more of the derived questions to verify the authenticity of the user. For example, conventional KBA accesses facts such as addresses, mortgage payments, and driving records from a LexisNexis® server, a credit bureau or a motor vehicle registry.

Suppose that a user wishes to make a purchase at a store using a store account. In conventional KBA, the store may ask the user a set of questions derived from a set of facts concerning the user in order to complete the purchase. Such questions may include "when were you married?", "what was the make and model of your first car?", and "what was the name of your first pet?". If the user answers the questions correctly, the store completes the purchase. On the other hand, if the user answers questions incorrectly, the store may take remedial steps to verify the authenticity of the user. For example, the store may ask for further proof of identity such as a driver's license.

SUMMARY

Unfortunately, there are deficiencies with the above-described conventional KBA. For example, conventional KBA derives questions simply from facts in a database without regard to who else may know those facts. Consequently, adversaries such as divorced spouses, disgruntled neighbors, or recently fired employees may know enough about such facts to correctly answer the derived questions. The reliance on such commonly-known facts weakens the security of conventional KBA.

In contrast to conventional KBA, in which security is weakened due to a reliance on commonly-known facts, an improved technique involves adjusting the operation of a KBA system based on facts that may contain information known to an adversary. Along these lines, the KBA system may receive an alert concerning an adversary that may know the answers to some of the KBA questions used by the KBA system in authenticating users. In response to alert, the KBA system may alter operations in order to account for the adversary. Subsequently, when a user requests authentication, the KBA system selects KBA questions based on adjustments made to the KBA system in order to avoid presenting the adversary with KBA questions derived from facts (s)he knows.

It should be understood that there are different kinds of adjustments in the improved technique. For example, the KBA system may choose to provide KBA questions that have not been identified as being derived from facts known to the adversary to a user requesting authentication. In this way, the KBA system may evaluate all answers it receives from the user. On the other hand, the KBA system may choose to send any KBA question, regardless of whether the KBA question has been identified, and then only evaluate those answers corresponding to KBA questions that have not been identified. In this way, the user does not suspect that any filtering of questions has taken place. In still another example, the KBA system may remove facts that have been identified as known to the adversary in order to prevent future KBA questions generated from the facts from having answers known by the adversary.

For example, suppose that, when a company fires a particular employee, the company submits a notice to a KBA system that controls access to the company's resources that the particular employee is now an ex-employee. The KBA system then finds facts that the ex-employee knows and questions that were generated from those facts and marks those facts and questions. In some arrangements, the KBA system removes marked questions from a questions database from which the KBA system provides questions. In other arrangements, the KBA system asks all questions, but does not consider answers from marked questions. In still other arrangements, the KBA system removes from a facts database marked facts.

Advantageously, the improved technique allows a KBA system to lower the risk that a sudden adversary recently removed from a group can use his or her knowledge to pose as still belonging to the group. For example, an employee that has been recently fired may use the novelty of his removal (i.e., knowledge of facts used in authentication) to attempt to sabotage a corporate information system. In trying to obtain access to the system, the ex-employee answers a number of questions from a KBA system; the KBA system is able to ask only questions that do not involve facts he would know. Because the ex-employee will likely answer incorrectly questions about facts he does not know, the KBA system will likely be able to deny access to the ex-employee.

One embodiment of the improved technique is directed to a method of verifying whether a user belongs to a group of users. The method includes receiving a request to isolate a particular user of the group of users as an adversary, a subset of the KBA data associated with the particular user being high risk KBA data. The method also includes performing a marking operation on the high risk KBA data, the marking operation being constructed and arranged to add marking metadata to the high risk KBA data in response to receiving the request. The method further includes selecting, after performing the marking operation on the high risk KBA data, a subset of KBA questions of the set of KBA questions based on which KBA data has marking metadata, the subset of KBA questions being selected by the KBA system being to lower a risk that the adversary will be able to authenticate as a member of the group of users.

Additionally, some embodiments of the improved technique are directed to a system constructed and arranged to verify whether a user belongs to a group of users. The system includes a network interface, memory, and a controller including controlling circuitry constructed and arranged to carry out the method of verifying whether a user belongs to a group of users.

Furthermore, some embodiments of the improved technique are directed to a computer program product having a non-transitory computer readable storage medium which stores code including a set of instructions to carry the method of verifying whether a user belongs to a group of users.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 3 is a block diagram illustrating an example table of links between users and facts in a database within the database server shown in FIG. 2.

DETAILED DESCRIPTION

An improved technique involves adjusting the operation of a KBA system based on facts that may contain information known to an adversary. Along these lines, the KBA system may receive an alert concerning an adversary that may know the answers to some of the KBA questions used by the KBA system in authenticating users. In response to alert, the KBA system may alter operations in order to account for the adversary. Subsequently, when a user requests authentication, the KBA system selects KBA questions based on adjustments made to the KBA system in order to avoid presenting the adversary with KBA questions derived from facts (s)he knows.

Advantageously, the improved technique allows a KBA system to lower the risk that a sudden adversary recently removed from a group can use his or her knowledge to pose as still belonging to the group. For example, an employee that has been recently fired may use the novelty of his removal (i.e., knowledge of facts used in authentication) to attempt to sabotage a corporate information system. In trying to obtain access to the system, the ex-employee answers a number of questions from a KBA system; the KBA system is able to ask only questions that do not involve facts he would know. Because the ex-employee will likely answer incorrectly questions about facts he does not know, the KBA system will likely be able to deny access to the ex-employee.

Figure 1:
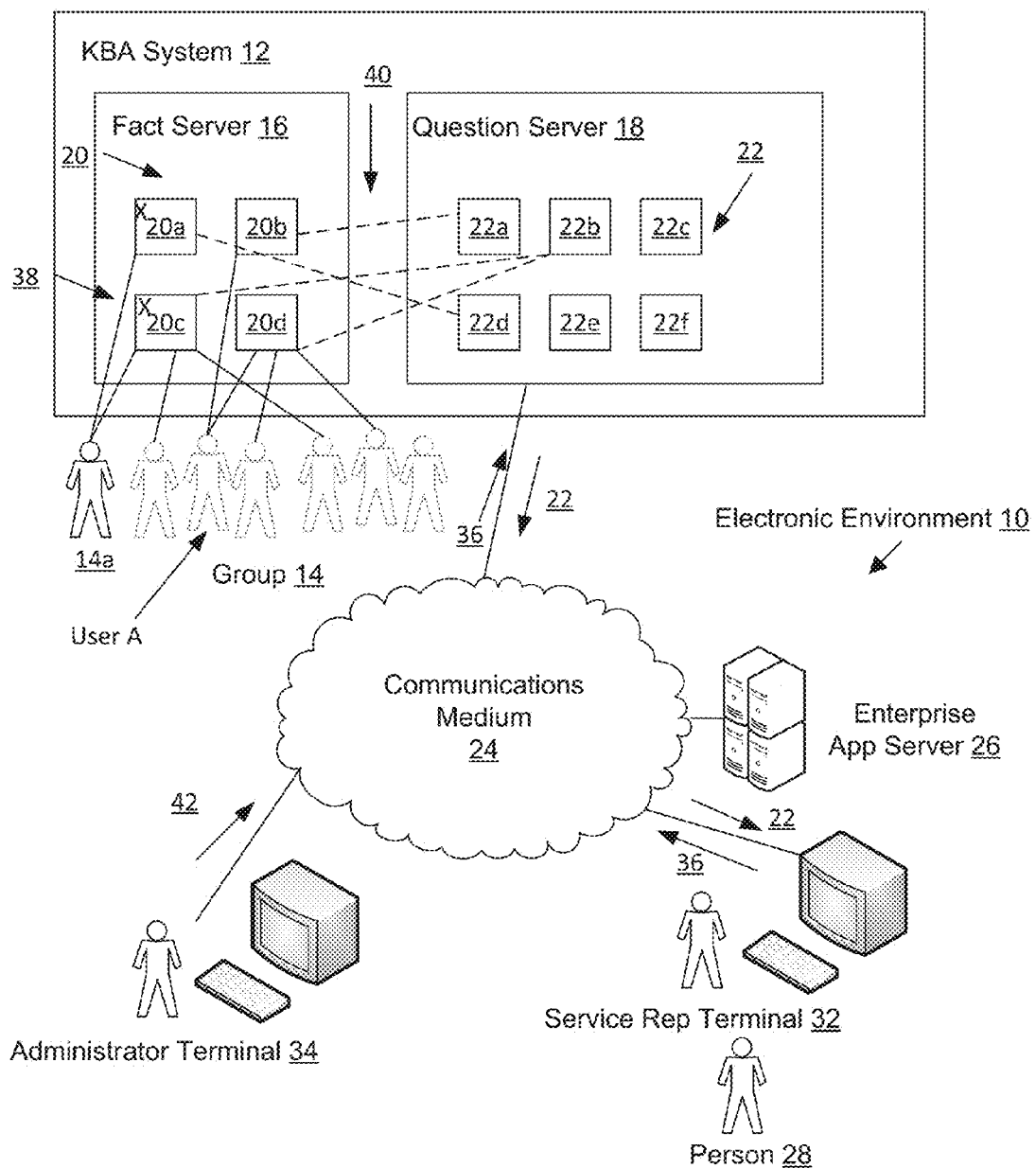
FIG. 1 is a block diagram illustrating an example electronic environment for carrying out the improved technique.

FIG. 1 illustrates an example electronic environment 10 for carrying out the improved technique. Electronic environment 10 includes KBA system 12, enterprise app server 26, service rep terminal 30, administrator terminal 34, and communications medium 24.

Communication medium 24 provides network connections between KBA system 12, enterprise app server 26, service rep terminal 30, and administrator terminal 34. Communications medium 24 may implement a variety of protocols such as TCP/IP, UDP, ATM, Ethernet, Fibre Channel, combinations thereof, and the like. Furthermore, communications media 24 may include various components (e.g., cables, switches/routers, gateways/bridges, NAS/SAN appliances/nodes, interfaces, etc.). Moreover, the communications medium 24 are capable of having a variety of topologies (e.g., queue manager-and-spoke, ring, backbone, multi drop, point to-point, irregular, combinations thereof, and so on).

KBA system 12 collects facts from a fact source (not illustrated), stores the facts, generates questions from the facts, provides questions to service rep terminal 32 via enterprise app server 26, and computes risk scores from answers received from person 28. KBA system 12 includes a fact server 16 and a question server 18.

Fact server 16 is an electronic system in communication with question server 18. Fact server 16 stores facts 20 and generates questions from facts 20. Fact server 16 includes a storage device on which facts 20a, 20b, 20c, 20d (facts 20) are stored. In some arrangements, fact server 16 stores facts 20 in a common format on a relational or NoSQL database 66 (see FIG. 2). For example, fact 20c states that particular user 14a was in a meeting with User A and User B last Wednesday at 2:00 PM. Further, fact 20b states that User A was in Kalamazoo last Friday.

It should be understood that facts 20 have references 38 to users of group 14 and, in some cases, particular user 14a. In some arrangements, a reference 38 is a direct mention of a user in a fact. In other arrangements, as will be described below with respect to FIGS. 3 and 4, a reference 38 does not have to be a direct mention of a user.

Question server 18 is an electronic system in communication with fact server 16. Question server 18 receives and stores questions 22a, 22b, 22c, 22d, 22e, and 22f (questions 22) generated by fact server 16. For example, question 22b is "Who attended the meeting with you last Wednesday at 2:00 PM?", while question 22d is "Where was User A last Friday?".

In some arrangements, question server 18 is also in communication with external systems such as enterprise app server 26. Question server 18 is also in communication with a service rep terminal 32 at which a service representative provides questions 22 to person 28.

Enterprise app server 26 provides an application programming interface (API) for providing questions to person 28.

Service rep terminal 32 receives questions from enterprise app server 26 and presents them to person 28, through a service representative. In some arrangements, service rep terminal 32 is a Netview terminal.

Administrator terminal 34 allows a system administrator to send an alert 42 to isolate a particular user 14a from a group 14 of users.

During operation, an administrator at administrator terminal 34 sends an alert 42, via communications medium 24, to KBA system 12; alert 42 includes instructions to isolate a particular user 14a from a group 14 of users. For example, group 14 includes employees of a corporation; the administrator sent alert 42 in response to notification that user 14a was fired from the corporation.

Fact server 16 adjusts operation of KBA server 12 by performing a marking operation on facts 20 and/or questions 22 in response to alert 42. Such a marking operation seeks to identify facts and/or questions of which particular user 14a may be knowledgeable. For example, fact server 16 adds marking metadata to facts 20 that have references 38 to particular user 14a. In FIG. 1, such marking metadata is illustrated by an "X". In this case, fact server 16 identifies unsecure facts (e.g., facts 20a and 20c) as those having marking metadata, and secure facts as facts that do not have marking metadata (e.g., facts 20b and 20d). In some arrangements, fact server 16 identifies questions that were derived from secure facts as secure questions that may be provided to users (e.g., questions 22a, 22c, 22e, and 22f). In other arrangements, fact server 16 only derives future questions 22 from secure facts 20b and 20d.

Sometime later, person 28 requests access to resources to which group 14 of users has access. In other words, person 28 wishes to be authenticated as a member of group 14.

Consider the case in which KBA system 12 provides both secure and insecure questions to person 28. Upon receiving the request, question server 18 ranks questions 22 according to a set of rules, and sends a set of questions 22 based on the ranking either to person 28 via enterprise app server 26, or to a service rep via NetView terminal 32. Person 28 sends answers 36 to the set of questions 22 back to KBA system 12.

KBA system 12 sends answers 36 to fact server 16 for analysis. In some arrangements, however, KBA system 12 sends answers 36 to question server 18.

Fact server 16 obtains questions 22 that were sent to person 28 and matches them with their corresponding answer 36. For example, the question 22b "Who attended the meeting with you last Wednesday at 2:00 PM?" would be matched with the corresponding answer 36, "Particular user 14a, User A, and User B". The question 22a "Where was User A last Friday?" would be matched with the corresponding answer "in the office".

Fact server 16 evaluates the answers 36 for correctness. In the example above, the answer to question 22b is correct, while the answer 36 to question 22a is incorrect (the correct answer is "Kalamazoo"). Fact server 16, however, determines from which facts 20 questions 22a and 22b were derived. In this example, fact server 16 finds that question 22a was derived from a secure fact, and question 22b was derived from an insecure fact.

Fact server 16 computes a risk score associated with person 28 based on answers 36 to questions 22 derived from secure facts 20. In this example, person 28 provided an incorrect answer 36 to question 22a which was derived from a secure fact 20b. Based on such a result, KBA system 12 increases the risk score. In contrast, answers to questions based on insecure facts do not affect the risk score.

It should be understood that fact server 16 may compute the risk score using a variety of algorithms. In some arrangements, fact server 16 implements a naïve Bayesian algorithm. In this case, facts server 16 uses Bayesian coefficients that correspond to risk factors such as those described above; another system may update such coefficients periodically based on feedback results. In other arrangements, fact server 16 uses machine learning or expectation-maximization to compute a risk score.

Further details concerning fact server 16 will be discussed below with respect to FIG. 2.

Figure 2:
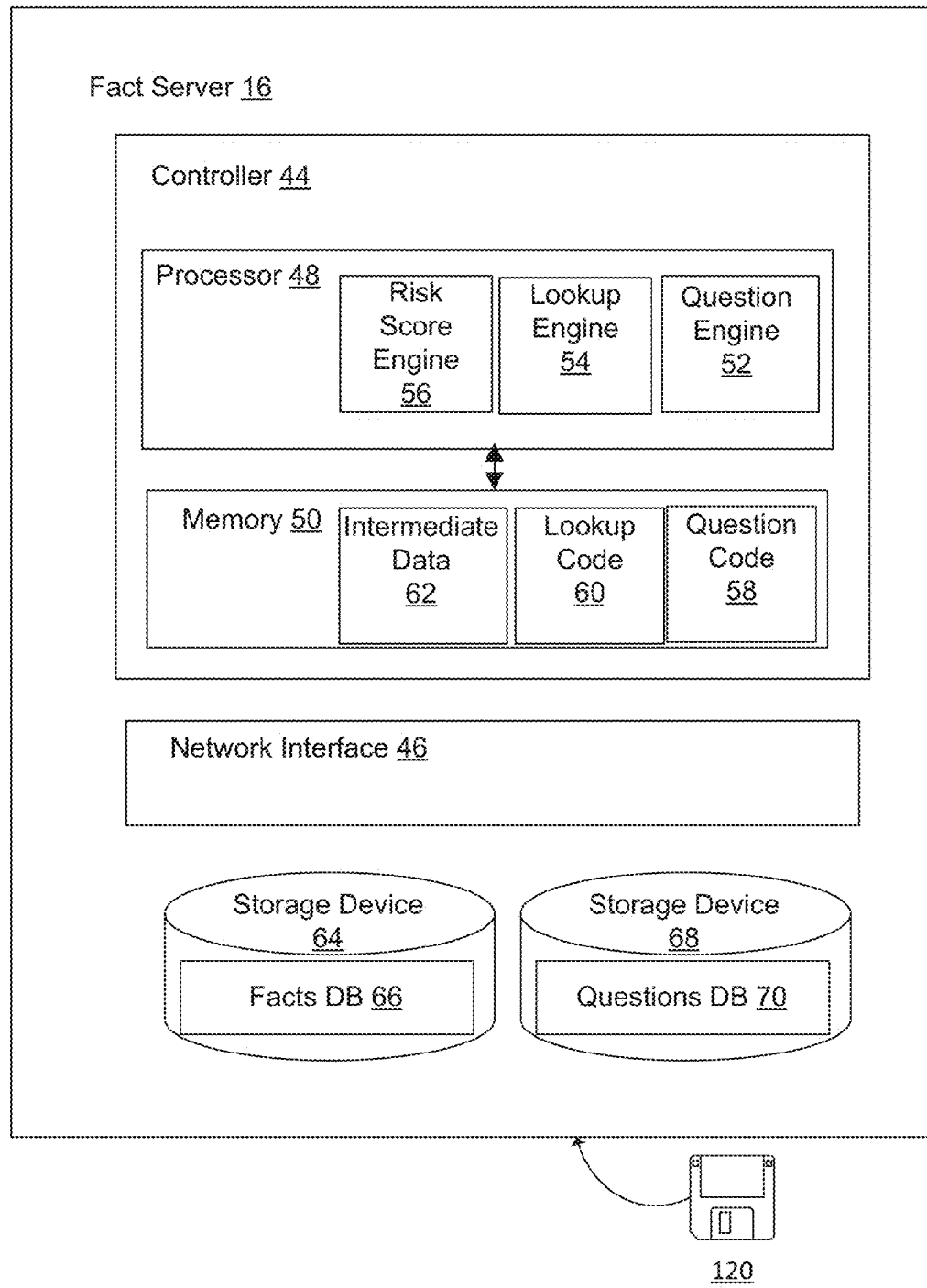
FIG. 2 is a block diagram illustrating an example fact server within the electronic environment shown in FIG. 1.

FIG. 2 illustrates further details of fact server 16. Fact server 16 includes controller 44, which in turn includes processor 38 and memory 50; network interface 46; and storage device 64 on which facts database 66 is stored.

Network interface 46 takes the form of an Ethernet card; in some arrangements, network interface 46 takes other forms including a wireless receiver and a token ring card.

Memory 50 is configured to store code which includes question code 58 configured to generate a set of questions 22 from facts 20 (see FIG. 1) stored in facts database 66 on storage device 64. Questions 22, in turn, are stored in questions database 70 on storage device 68. Memory 50 also includes space for intermediate data 62, in which intermediate results of question building are stored, as well as lookup code 60 for performing lookup operations on facts 20. Memory 50 generally takes the form of, e.g., random access memory, flash memory or a non-volatile memory.

Processor 48 takes the form of, but is not limited to, Intel or AMD-based MPUs, and can include a single or multi-cores each running single or multiple threads. Processor 48 is coupled to memory 50 and is configured to execute instructions from question code 58 and lookup code 60. Processor 48 includes question engine 52, lookup engine 54, and risk score engine 56.

During operation, processor 48 receives alert 42 via network interface 46 (see FIG. 1) to isolate particular user 14a from group 14 and stores alert 42 in memory 50. In response, lookup engine 54 performs a lookup operation to find facts 20 stored in facts database 66 have references to particular user 14a. Processor 48 then adds marking metadata to each such fact 20. In some arrangements, processor 48 adds as marking metadata a particular field value in database 66 that denotes a fact as an unsecure fact.

Sometime later, processor 48 receives a message via network interface 46 to authenticate person 28 as a member of group 14. In response to the message, processor 48 sends instructions to question server 18 to send a set of questions 22 to person 28 (via enterprise app server 26 or service rep terminal 32). Processor 48 also receives questions 22 and stores them in intermediate data 62 in memory 50.

Processor 48 subsequently receives answers 36 via network interface 46 and stores answers 36 in intermediate data 62 in such a way as to map each answer 36 with its corresponding question 22. Processor 48, via lookup engine 54, evaluates each answer 36 via facts 20 as either correct or incorrect.

For each question 22, processor 48 determines if the question 22 was derived from a secure fact (i.e., no marking metadata) or an unsecure fact (i.e., having marking metadata).

Risk score engine 56 assesses the answers 36 to secure questions 22 only. Risk score engine 56 then generates a risk score to be stored in memory 50. In some arrangements, risk score engine 56 increases the value of the risk score when an answer 36 to a secure question 22 is incorrect; risk score engine 56 decreases the value of the risk score when answer 36 to a secure question 22 is correct.

It should be understood that there are degrees of reference in each fact. That is, even though there may not be a direct reference to particular user 14a in fact 20b, particular user 14a may still have some knowledge of fact 20b. Details of an example way to determine such knowledge are illustrated below with respect to FIGS. 3 and 4.

FIG. 3 illustrates a table 72 representing results of a lookup process stored in memory 50. Table 72 is a link table representing a table of references, or links, between facts 20 and users from group 14. Table 74 is a link strength table representing link strengths between facts 20 and users from group 14. For both tables 72 and 74, group 14 includes User A, User B, User C, User D, and User E. The facts 20 include Fact1 through Fact 8, each represented as an entry in tables 72 and 74.

Link table 72 represents the relationship between facts 20 and users of group 14. For each fact 20, link table 60 shows whether there is a reference to each user of group 14. For example, Fact1 has references to all users of group 14. In contrast, Fact8 has references to no users of group 14.

Link strength table 74 represents how many users to whom each fact refers. Specifically, link strength table 74 includes fields for a link strength 76, which refers to how many users of group 14 are referred to by a fact. To continue the example above, Fact1 has a link strength of 6 (all 6 users of group 14 have a reference in Fact1). In contrast, Fact5 has a link strength of 4 (4 users of group 14 have a reference in Fact5).

Fact server 16 uses link strength table 74 in determining which facts 20 have a reference to particular user 14a. Along these lines, fact server 16 favors entries in link strength table 74 that have a large value of link strength 76. For example, fact server 16 forms a set of weights corresponding to each fact used in building questions. In some arrangements, fact server 16 generates the set of weights based on the link strengths 76 such that larger link strengths produce smaller weights. In this way, questions that are known to too many users in group 14 are excluded from consideration in computing the risk score due to a high chance that particular user 14a will know the answer to a question.

In some arrangements, however, additional analysis is needed. For example, it may be important to know more detail about the relationships between various users of group 14 in order to determine the role of the various facts 20 in building questions. An example of such detail is shown with respect to FIG. 4.

Figure 4:
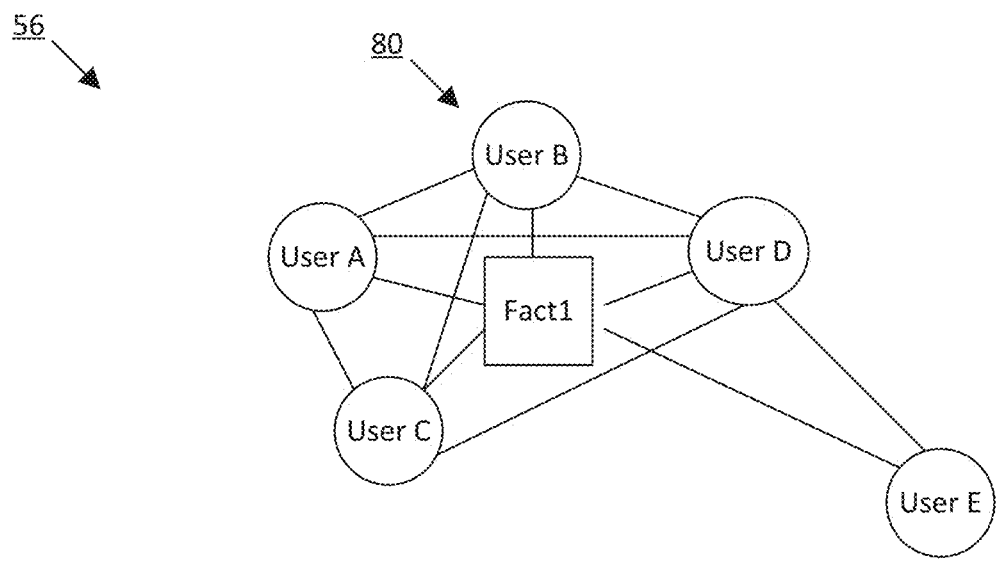
FIG. 4 is a block diagram illustrating example graphs representing relationships between users for selected facts in the database shown in FIG. 3.
Figure 4:
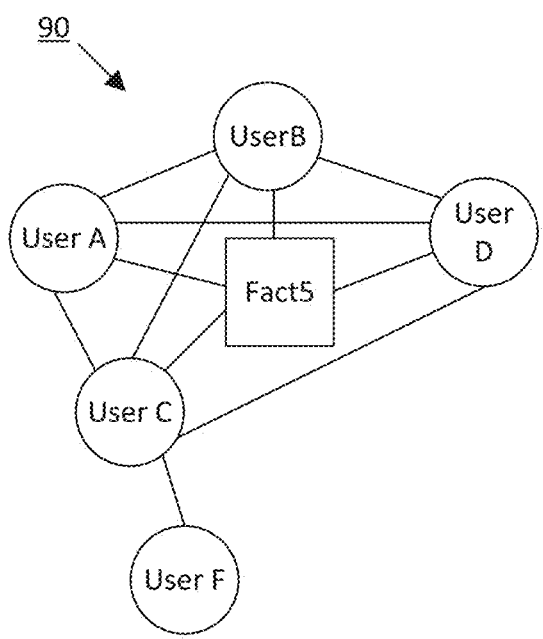

FIG. 4 illustrates graphs 80 and 90 which represent example relationship details between various users for facts Fact1 and Fact5, respectively.

Graph 80 is a graph of various relationships between the users User A, User B, User C, User D, and User E as described with respect to the example above; in this example, User E represents particular user 14*a*. Graph 80 is an example of a graph generated using a force-based algorithm, in which the users are represented as nodes and relationships between users are represented as edges. In graph 80, each user has an edge connecting its respective node to a node representing Fact1; this reflects the fact that, for Fact1, there is a reference to each user of population 14. Further, in force-based algorithms, each node and edge are modeled as being subject to various physical laws; for example, each edge can be thought of as a spring subject to Hooke's law, and each vertex can be thought of as a charge subject to Coulomb's law, although other physical laws may be used in drawing a graph. By calibrating the parameters of the graph to known data (e.g., using appropriate values of charges and spring constants), a force-based algorithm can draw a graph which, in equilibrium, accurately represents the "closeness" of users and the impact of that closeness on question building.

Along these lines, suppose that group 14 represents employees within an organization that regularly attends a series of meetings, and Fact1 represents a particular instance of the series of meetings (e.g., a meeting on a particular day not too long ago). The employees all were at this particular meeting (or had knowledge of it through a calendar entry). References between employees are each represented by an edge, or a line connecting the various nodes. Further, User E is referenced in Fact1 and have respective edges drawn to the node representing Fact1. User E also has a connection to User D. For example, User E shared a cubicle with User D and has been invited this one time to the meeting. Those relationships may be characterized by particular values of charges and spring constants in the forced-base algorithm for drawing graph 80.

It should be understood that "connections" between two users in this context means a number of facts mentioning both users. Lookup engine 54 performs periodic lookup operations to determine this numbers of connections between pairs of users of group 14 and stores these numbers in memory 50. Processor 48 then accesses these numbers from memory 50 when building a graph in response to the message that person 28 wishes to be authenticated. A decision to include Fact1 in question building involves comparing a minimum distance between nodes representing users belonging to group 14 to a distance threshold; if the minimum distance is less than the distance threshold, Fact1 is excluded from question building.

Question engine 52 builds questions taking into account distances between various nodes in graph 80. Along these lines, users in group 14 are all close to each other and to Fact1, and therefore have a strong relationship with each other and Fact1. User E, although connected, is far from User D, meaning that there are probably few connections between User C and User D other than by sharing a cubicle. In such a case, it may be a relatively low risk to include facts involving User C and User D that exclude User E.

Graph 90, on the other hand, shows these relationships but with User E having no references to Fact5, and having the same relationships as described with respect to graph 80. In this case, while the risk may be lower of User E knowing information regarding group 14, the existence of the connections to User D and User C, respectively, makes determining whether to include Fact5 in a risk score computation a nontrivial exercise.

Figure 5:
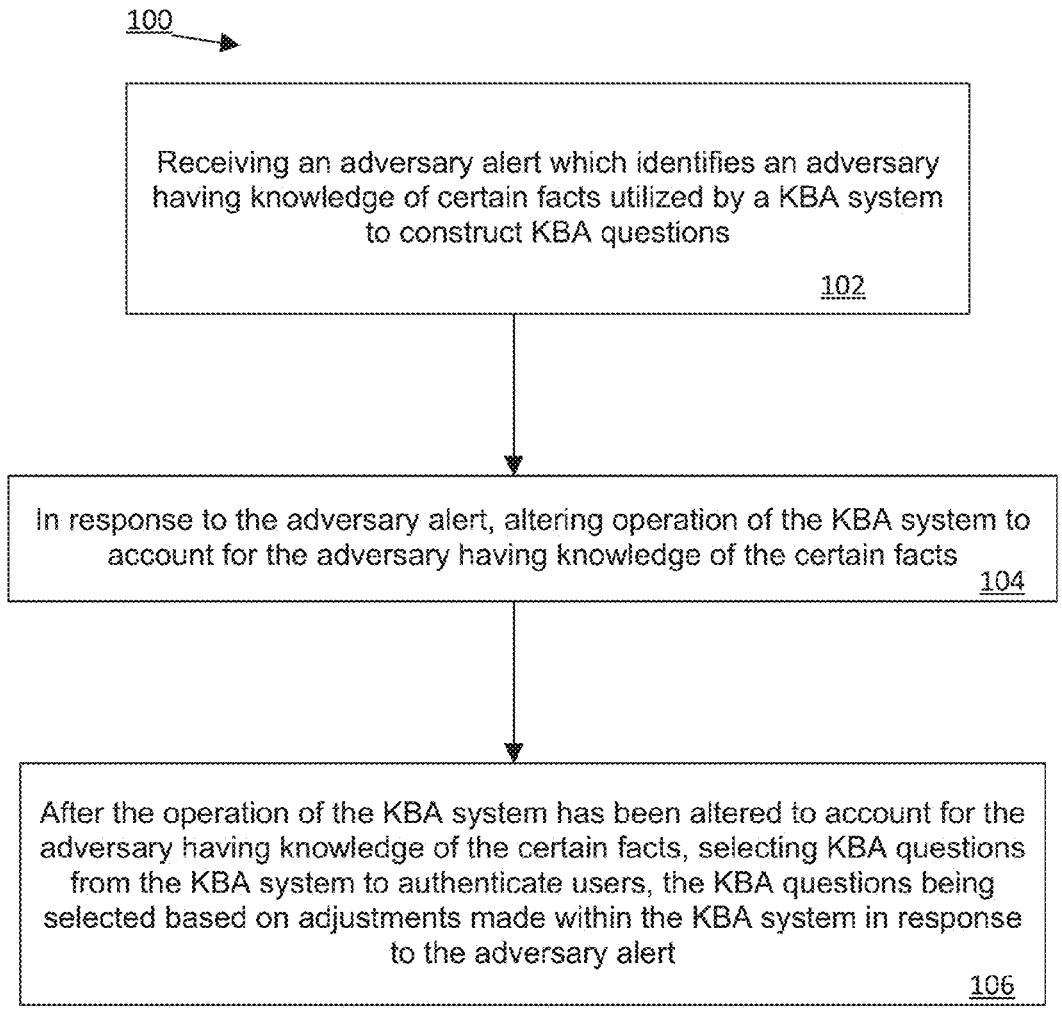
FIG. 5 is a flow chart illustrating a method of carrying out the improved technique within the electronic environment shown in FIG. 1.

FIG. 5 illustrates a method 100 of verifying whether a user belongs to a group of users. In step 102, a request to isolate a particular user of the group of users as an adversary is received, a subset of the KBA data associated with the particular user being high risk KBA data. In step 104, a marking operation is performed on the high risk KBA data in response to receiving the request, the marking operation being constructed and arranged to add marking metadata to the high risk KBA data. In step 106, a subset of KBA questions of the set of KBA questions is selected, after performing the marking operation on the high risk KBA data, based on which KBA data has marking metadata, the subset of KBA questions being selected by the KBA system being to lower a risk that the adversary will be able to authenticate as a member of the group of users.

While various embodiments of the invention have been particularly shown and described, it will be understood by those skilled in the art that various changes in form and details may be made therein without departing from the spirit and scope of the invention as defined by the appended claims.

For example, in some arrangements, fact server 16 performs a marking operation on questions in questions server 70. In this case, fact server 16 may delete unsecure questions (i.e., questions having marking metadata) from questions server 70. Alternatively, fact server 70 may still provide unsecure questions to person 28 and base the risk score on answers to secure questions only.

Furthermore, it should be understood that some embodiments are directed to fact server 16 within KBA system 12, which is constructed and arranged to verify whether a person belongs to a group of users. Some embodiments are directed to a process of verifying whether a person belongs to a group of users in the KBA system. Also, some embodiments are directed to a computer program product which enables computer logic to verify whether a person belongs to a group of users in a KBA system.

In some arrangements, fact server 16 is implemented by a set of processors or other types of control/processing circuitry running software. In such arrangements, the software instructions can be delivered, within fact server 16, respectively (see FIG. 2), in the form of a computer program product 130, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of performing knowledge-based authentication (KBA), the method comprising:
   receiving an adversary alert which identifies an adversary having knowledge of certain facts utilized by a KBA system to construct KBA questions;
   in response to the adversary alert, altering operation of the KBA system to account for the adversary having knowledge of the certain facts; and
   after the operation of the KBA system has been altered to account for the adversary having knowledge of the certain facts, selecting KBA questions from the KBA system to authenticate users, the KBA questions being selected based on adjustments made within the KBA system in response to the adversary alert;
   wherein the method further comprises generating a link table that includes a set of entries, each entry of the set of entries including (i) a fact identifier identifying a fact of a set of facts and (ii) a user identifier identifying a user to whom the fact has a reference; and wherein altering the operation of the KBA system includes:
finding a particular entry of the set of entries of the link table, the particular entry including a user identifier identifying the adversary, and
filtering, from the set of facts, the fact identified by the fact identifier of the particular entry to form a set of secure facts, a secure fact of the set of secure facts being utilized by the KBA system to construct a secure KBA question that the adversary is unlikely to answer correctly.

2. A method as in claim 1,
wherein finding the particular entry including the user identifier identifying the adversary includes:
for each fact of the facts utilized by the KBA system, producing a link strength that represents the number of users of the group of users in the link table;
identifying the fact as an unsecure fact when the link strength is greater than a threshold link strength; and
identifying the fact as a secure fact when the link strength is less than the threshold link strength.

3. A method as in claim 2,
wherein the KBA system includes a questions database in which the KBA questions are stored;
wherein the method further comprises:
removing, from the questions database, KBA questions that had been generated from unsecure facts.

4. A method as in claim 3,
wherein a minimum number of questions in the questions database is based on the threshold link strength;
wherein removing KBA questions from the questions database includes:
stopping removal of questions when the number of questions in the database is less than the minimum number of questions in the questions database.

5. A method as in claim 1,
wherein the particular entry including the user identifier identifying the adversary includes:
for each fact of the facts utilized by the KBA system, using a force-based algorithm to produce a set of nodes of a graph representing the users of the group of users in the link table; and
identifying the fact as a secure fact when a minimum distance between nodes representing users of the group of users and other nodes is less than an external distance threshold.

6. A method as in claim 1,
wherein altering the operation of the KBA system further includes:
identifying unsecure KBA questions of the KBA questions from the KBA system;
wherein selecting the KBA questions includes:
providing the KBA questions from the KBA system to a user requesting authentication; and
wherein the method further comprises:
receiving a set of answers, each answer of the set of answers corresponding to a KBA question from the KBA system, and
filtering answers of the set of answers that correspond to the unsecure KBA questions to form a set of secure answers.

7. A method as in claim 6,
wherein the method further comprises:
generating a risk score from the set of secure answers, the risk score being based on a number of answers of the set of secure answers that are correct, and
providing or denying authentication to the user based on a value of the risk score.

8. A method as in claim 7,
wherein generating the risk score includes:
increasing the value of the risk score in response to an answer of the set of answers being incorrect, and
decreasing the value of the risk score in response to an answer of the set of answers being correct.

9. A method as in claim 8,
wherein providing or denying authentication to the user based on a value of the risk score includes:
providing authentication to the user when the value of the risk score is below a risk score threshold value, and
denying authentication to the user when the value of the risk score is above a risk score threshold value.

10. A KBA system constructed and arranged to perform a KBA operation, the KBA system comprising:
a network interface;
memory; and
a controller including controlling circuitry, the controlling circuitry being constructed and arranged to:
receive an adversary alert which identifies an adversary who (i) is not authorized to access a resource and (ii) has knowledge of certain facts utilized by a KBA system to construct KBA questions;
in response to the adversary alert, perform an adjustment operation on the KBA system to produce an adjustment to the KBA system, the adjustment to the KBA system accounting for the adversary having knowledge of the certain facts; and
after performing the adjustment operation on the KBA system, select KBA questions from the KBA system to authenticate users, the KBA questions being selected based on the adjustment to the KBA system so that the adversary may be prevented from accessing the resource;
wherein the controlling circuitry is further constructed and arranged to generate a link table that includes a set of entries, each entry of the set of entries including (i) a fact identifier identifying a fact of a set of facts and (ii) a user identifier identifying a user to whom the fact has a reference; and
wherein the controlling circuitry constructed and arranged to alter the operation of the KBA system is further constructed and arranged to:
find a particular entry of the set of entries of the link table, the particular entry including a user identifier identifying the adversary, and
filter, from the set of facts, the fact identified by the fact identifier of the particular entry to form a set of secure facts, a secure fact of the set of secure facts being utilized by the KBA system to construct a secure KBA question that the adversary is unlikely to answer correctly.

11. A KBA system as in claim 10,
wherein the controlling circuitry constructed and arranged to perform the adjustment operation on the KBA system is further constructed and arranged to:
identify unsecure KBA questions of the KBA questions from the KBA system;
wherein the controlling circuitry constructed and arranged to select the KBA questions is further constructed and arranged to:

provide the KBA questions from the KBA system; and
wherein the controlling circuitry is further constructed and arranged to:
- receive a set of answers, each answer of the set of answers corresponding to a KBA question from the KBA system, and
- filter answers of the set of answers that correspond to the unsecure KBA questions to form a set of secure answers.

12. A KBA system as in claim 11,
wherein the controlling circuitry is further constructed and arranged to:
- generate a risk score from the set of secure answers, the risk score being based on a number of answers of the set of secure answers that are correct, and
- provide or deny authentication to the user based on a value of the risk score.

13. A KBA system as in claim 12,
wherein the controlling circuitry constructed and arranged to generate the risk score is further constructed and arranged to:
- increase the value of the risk score in response to an answer of the set of answers being incorrect, and
- decrease the value of the risk score in response to an answer of the set of answers being correct.

14. A KBA system as in claim 13,
wherein the controlling circuitry constructed and arranged to provide or deny authentication to the user based on a value of the risk score is further constructed and arranged to:
- provide authentication to the user when the value of the risk score is below a risk score threshold value, and
- deny authentication to the user when the value of the risk score is above a risk score threshold value.

15. A computer program product having a non-transitory, computer-readable storage medium which stores code to perform KBA, the code including instructions to:
- receive an adversary alert which identifies an adversary having knowledge of certain facts utilized by a KBA system to construct KBA questions;
- in response to the adversary alert, alter operation of the KBA system to account for the adversary having knowledge of the certain facts; and
- after the operation of the KBA system has been altered to account for the adversary having knowledge of the certain facts, select KBA questions from the KBA system to authenticate users, the KBA questions being selected based on adjustments made within the KBA system in response to the adversary alert;
- wherein code further includes instructions to generate a link table that includes a set of entries, each entry of the set of entries including (i) a fact identifier identifying a fact of a set of facts and (ii) a user identifier identifying a user to whom the fact has a reference; and
- wherein altering the operation of the KBA system includes:
  - finding a particular entry of the set of entries of the link table, the particular entry including a user identifier identifying the adversary, and
  - filtering, from the set of facts, the fact identified by the fact identifier of the particular entry to form a set of secure facts, a secure fact of the set of secure facts being utilized by the KBA system to construct a secure KBA question that the adversary is unlikely to answer correctly.

16. A method of performing knowledge-based authentication (KBA), the method comprising:
- receiving an adversary alert which identifies an adversary having knowledge of certain facts utilized by a KBA system to construct KBA questions;
- in response to the adversary alert, altering operation of the KBA system to account for the adversary having knowledge of the certain facts; and
- after the operation of the KBA system has been altered to account for the adversary having knowledge of the certain facts, selecting KBA questions from the KBA system to authenticate users, the KBA questions being selected based on adjustments made within the KBA system in response to the adversary alert;
- wherein the KBA system utilizes a plurality of facts to construct the KBA questions;
- wherein altering the operation of the KBA system includes filtering the certain facts from the plurality of facts to form a set of secure facts;
- wherein selecting the KBA questions from the KBA system to authenticate the users includes transmitting data representing an unsecure KBA question and a secure KBA question to a user requesting access to a resource, the unsecure KBA question having been constructed by the KBA system utilizing a certain fact, the secure KBA question having been constructed by the KBA system utilizing a secure fact of the set of secure facts; and
- wherein the method further comprises:
  - after data representing an incorrect answer to the unsecure KBA question is received from the user, generating a first risk score; and
  - after data representing an incorrect answer to the secure KBA question is received from the user, generating a second risk score, the second risk score being greater than the first risk score, the first risk score and the second risk score each indicating a likelihood that the user is not authorized to access the resource, a larger risk score indicating a larger likelihood that the user is not authorized to access the resource.

* * * * *